(12) United States Patent
Lee et al.

(10) Patent No.: US 9,293,780 B2
(45) Date of Patent: Mar. 22, 2016

(54) SULFONATED POLY(PHENYLENE SULFIDE SULFONE NITRILE) AND MEMBRANE FOR FUEL CELL THEREOF

(71) Applicants: Hyundai Motor Company, Seoul (KR); IUCF-HYU (Industry-University Cooperation Foundation Hanyang University), Seoul (KR)

(72) Inventors: Young Moo Lee, Seoul (KR); So Young Lee, Seoul (KR); Dong Won Shin, Seoul (KR); Na Rae Kang, Gyeonggi-do (KR); Young Taek Kim, Incheon (KR); Inchul Hwang, Seoul (KR); Nak Hyun Kwon, Seoul (KR)

(73) Assignees: Hyundai Motor Company, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 361 days.

(21) Appl. No.: 13/661,481

(22) Filed: Oct. 26, 2012

(65) Prior Publication Data
US 2013/0266890 A1 Oct. 10, 2013

(51) Int. Cl.
*H01M 8/10* (2006.01)
*H01M 8/00* (2006.01)
*C08G 75/14* (2006.01)
*C08G 75/20* (2006.01)

(52) U.S. Cl.
CPC ............ *H01M 8/1039* (2013.01); *H01M 8/103* (2013.01); *H01M 8/1027* (2013.01); *H01M 8/1072* (2013.01); *Y02E 60/522* (2013.01); *Y02P 70/56* (2015.11)

(58) Field of Classification Search
CPC ........................................................ H01M 8/10
USPC ...................... 528/374, 391, 378; 521/27, 25; 429/494, 33, 12; 428/220
See application file for complete search history.

(56) References Cited

FOREIGN PATENT DOCUMENTS

| KR | 10-0868802 | 8/2007 |
|---|---|---|
| KR | 10-0819332 | 3/2008 |
| KR | 10-1087573 | 11/2010 |

OTHER PUBLICATIONS

Lee et al; Synthesis—methanol fuel cell applications; 2009; Macromolecular rapid Communications, 30(1), South Korea; Chem Abstract 150: 330270.*

Kim et al., "Fluorinated Poly(arylene ether sulfide) for Polymeric Optical Waveguide Devices", Macromolecules, vol. 34, No. 22, pp. 7817-7821 (2001).

* cited by examiner

*Primary Examiner* — Duc Truong
(74) *Attorney, Agent, or Firm* — Mintz Levin Cohn Ferris Glovsky and Popeo, P.C.; Peter F. Corless

(57) ABSTRACT

The present invention provides sulfonated poly(phenylene sulfide sulfone nitrile) and a polymer electrolyte membrane thereof. In particular, the present invention provides sulfonated poly(phenylene sulfide sulfone nitrile) having a triple bond at its both ends and a polymer electrolyte membrane with superior mechanical properties prepared by heating sulfonated poly(phenylene sulfide sulfone nitrile) and forming cross-links between ends of sulfonated poly(phenylene sulfide sulfone nitrile).

8 Claims, 9 Drawing Sheets

SULFONATED POLY(PHENYLENE SULFIDE SULFONE NITRILE) AND MEMBRANE FOR FUEL CELL THEREOF

CROSS REFERENCE TO RELATED APPLICATIONS

This application claims benefit from Korean Patent Application No. 10-2012-0037368 filed on Apr. 10, 2012, which is incorporated herein by reference in their entirety.

FIELD OF THE INVENTION

The present invention provides sulfonated poly(phenylene sulfide sulfone nitrile) and a polymer electrolyte membrane using the same. In particular, the present invention provides sulfonated poly(phenylene sulfide sulfone nitrile) having a triple bond at its both ends and a polymer electrolyte membrane with excellent physical properties which is prepared by forming a cross-link between both ends of sulfonated poly (phenylene sulfide sulfone nitrile) by heating.

BACKGROUND

Currently, a sulfonated polymer has been widely used as a polymer electrolyte for fuel cells. The sulfonated polymer is useful because the introduction of a sulfonic acid group provides hydrophilicity to the polymer, which makes it possible to contain water capable of carrying a proton ($H^+$) and simultaneously makes it possible to deliver the proton due to the acidity of the sulfonic acid group itself.

In the case of preparing a polymer with an introduced sulfonic acid group that is useful as a polymer electrolyte membrane for fuel cells, one of the methods of increasing proton conductivity, a representative property influencing on fuel cell performance, is to increase a degree of sulfonation. However, if the sulfonation degree of the polymer used as a polymer electrolyte membrane, into which a sulfonic acid group is introduced, is increased, there is a problem due to a simultaneous increase in moisture content and dimensional changes. Therefore, the electrolyte membrane prepared by using the polymer with an introduced a sulfonic acid group suffers from problems of an increased pressure within a stack during the operation of a fuel cell and a decreased bonding capability to a catalyst layer, leading to a lowered fuel cell performance.

Korean Patent No. 10-0819332 discloses one of the conventional techniques for preparing a polymer with an introduced sulfonic acid group as a polymer electrolyte membrane. Specifically, it discloses a method for preparing a poly(arylene ether) copolymer including a cross-link structure at its end and a polymer electrolyte membrane comprising the copolymer. According to the method, a dihydroxy monomer containing a sulfonate group and a dihalide monomer are subjected to polycondensation, or a dihalide monomer containing a sulfonate group and a dihydroxy monomer are subjected to polycondensation, thereby to synthesize poly (arylene ether) copolymers containing a sunfonic acid that are represented by the following Formulae (a), (b) and (c), respectively.

[Formula (a)]

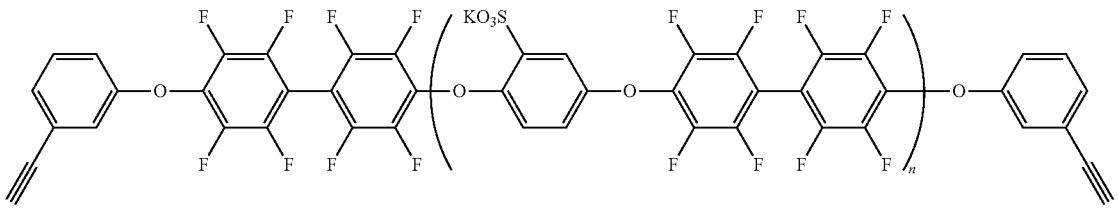

[Formula (b)]

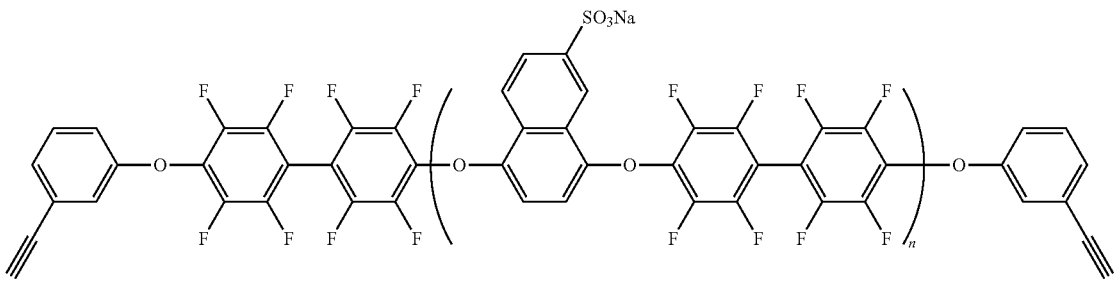

[Formula (c)]

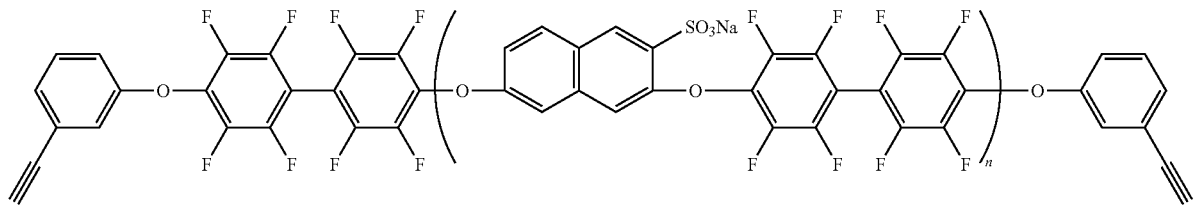

Further, Korean Patent No. 10-0868802 discloses a method for preparing a composite proton conductive polymer membrane with superior mechanical properties and a good performance. Since the thus prepared polymer can contain moisture itself, even in the presence of moisture, there is little risk that phosphoric acid is eluted therefrom, thereby improving fuel cell performance. According to the method, a conductive polymer containing decafluoro biphenyl and 4,4-(hexafluoroisopropylidene)diphenol or 4,4-isopropylidene dihenol and having a sulfonic acid group at a main chain, and a polymer represented by the following Formula (d) that may form an acid/base cross-linkage with the sulfonic acid group of the conductive polymer, can be prepared.

Moreover, a method for preparing a fluorosubstituted polyarylene ether sulfone copolymer represented by the following Formula (f) that can be used as a polymer for an optical waveguide device has been developed (Polymer, 44, (2003) 4189-4195).

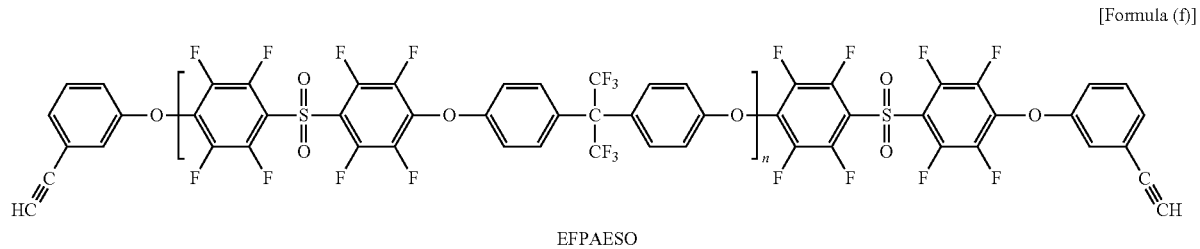

[Formula (f)]

EFPAESO

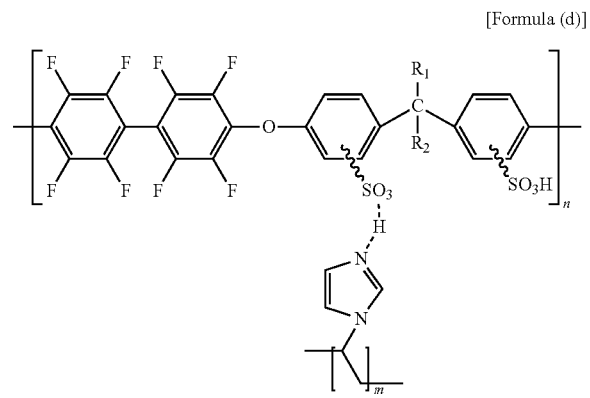

[Formula (d)]

Further, Korean Patent Application Publication No. 2010-0120519 discloses polysulfone represented by Formula (e) that is cross-linked with a dicarbonyl group, a polymer electrolyte membrane using the same, and a method for preparing a fuel cell comprising the membrane. According to the method, polysulfone can be prepared by reacting a compound (wherein Y is a bond between carbon and —S—, —O—, or —S(=O)$_2$— to which carbon binds directly, z is a cation exchanger or metal salts thereof, and Ar is divalent C5~C24 arylene or divalent C5~C24 heteroarylene) with a compound having a dicarbonyl group.

From the above polymers with a sulfone group introduced, a polymer electrolyte membrane through end cross-linking the sulfone group can be prepared. However, the thus prepared polymer electrolyte membranes showed only a partial improvement in physical properties due to the characteristics of the polymer compound, and they still suffer from the afore-discussed problems. Therefore, when the above polymers are used to make a polymer electrolyte membrane, an overall improvement in physical properties has not yet been achieved.

SUMMARY OF THE INVENTION

The present inventors have endeavored to overcome the above mentioned problems in the prior art, and found that a polymer with a sulfonic acid group introduced and with its main chain composed of an aromatic ring, sulfide, sulfone, and a nitrile functional groups shows improved physical properties, such as, an improved dimensional stability and an improved bonding capability to a catalyst layer.

Accordingly, in one aspect, the present invention provides a novel sulfonated poly(phenylene sulfide sulfone nitrile) with an introduced sulfone group. The sulfonated poly(phenylene sulfide sulfone nitrile) is capable of forming cross-links at its ends In another aspect, the present invention provides a polymer electrolyte membrane prepared by cross-linking the sulfonated poly(phenylene sulfide sulfone nitriles).

In a further aspect, the present invention provides a polymer electrolyte membrane with improved physical properties, such as, high conductivity, an improved dimensional stability, and an improved bonding capability to a catalyst layer.

In accordance with an aspect thereof, the present invention provides sulfonated poly(phenylene sulfide sulfone nitrile) represented by one selected from the following Formulae 1 to 5.

[Formula (e)]

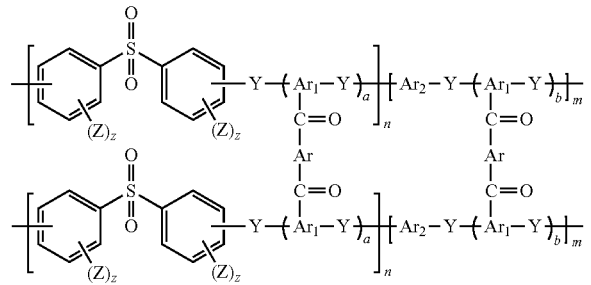

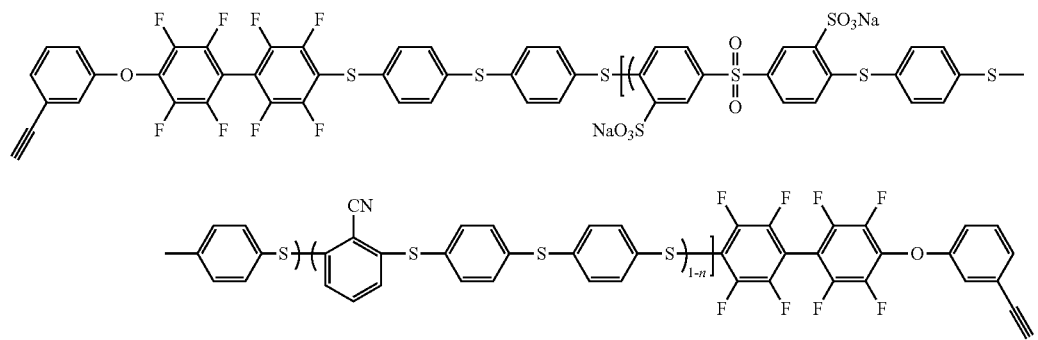
[Formula 1]
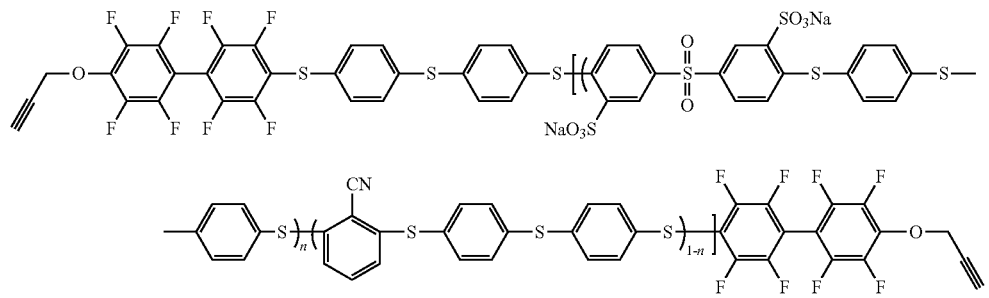
[Formula 2]
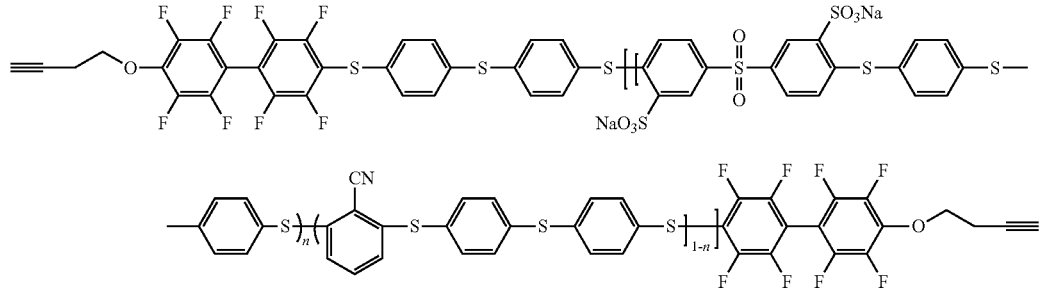
[Formula 3]
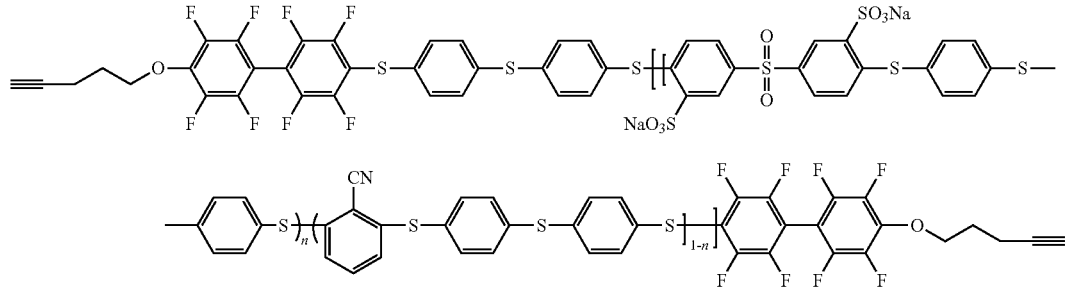
[Formula 4]
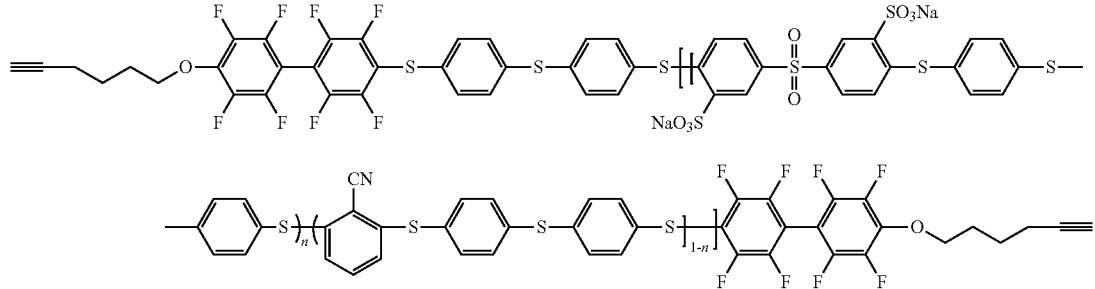
[Formula 5]

wherein n represents the number of a sulfone-containing monomer in the sulfonated poly(phenylene sulfide sulfone nitrile), which represents a degree of sulfonation.

Further, the present invention provides a method for preparing sulfonated poly(phenylene sulfide sulfone nitrile) represented by one selected from the above Formulae 1 to 5, comprising:

synthesizing an A-B random polymer having a thiol group by polymerizing a hydrophilic repeat unit (A) composed of 4,4'-thiobisbenzenethiol and 3,3'-disulfonated-4,4'-dichlorodiphenyl sulfone and a hydrophobic repeat unit (B) composed of 4,4'-thiobisbenzenethiol and 2,6-dichlorobenzonitril;

synthesizing a C-A-B-C polymer by linking decafluorobiphenyl (C) as a linker to each of (A) and (B) ends of the A-B polymer; and forming a random polymer having a D-C-A-B-C-D structure by using (D) having a triple bond as an end group for cross-linking at both ends (C) of the C-A-B-C polymer, wherein (D) is selected from the group consisting of ethynylphenol, propagyl alcohol, 3-butynol, 4-pentynol and 5-hexynol.

Further, the present invention provides a polymer electrolyte membrane in which the sulfonated poly(phenylene sulfide sulfone nitriles) represented by one selected from the above Formulae 1 to 5 are cross-linked each other at their ends.

In addition, the present invention provides a method of preparing a polymer electrolyte membrane, comprising heating the sulfonated poly(phenylene sulfide sulfone nitriles) of Formula 1 to a temperature of 220 to 280° C. and forming cross-links between their ends, thereby to prepare the polymer electrolyte membrane.

Effect of the Invention

As the sulfonated poly(phenylene sulfide sulfone nitrile) according to the present invention has a main chain composed of an aromatic ring, sulfide and sulfone and has a sulfonation degree of 50% or higher, the polymer has an improved stability. Further, it shows an enhanced bonding capability to a catalyst layer due to the introduction of a nitrile group into the main chain thereof.

In addition, by using a polymer electrolyte membrane prepared by forming cross-links between the ends of these polymers, it is possible to obtain a polymer membrane with a sulfonation degree of 50% or higher. Such a polymer membrane exhibits an improved dimensional stability, moisture content and mechanical properties with high conductivity, thereby offering a good fuel cell performance under low moisture conditions.

Accordingly, a polymer with a sulfonic acid group introduced can be effectively used as a polymer electrolyte for fuel cells, a polymer for water treatment, a hydrophilic membrane, and the like.

BRIEF DESCRIPTION OF THE DRAWINGS

FIGS. 2a and 2b are graphs comparing mechanical properties of the polymer membranes prepared in Examples and Comparative Examples, wherein FIG. 2a shows the mechanical properties measured under dry conditions (Dry), and FIG. 2b shows the mechanical properties measured under wet conditions (Wet).

FIGS. 3a and 3b are graphs comparing a water uptake rate of the polymer membranes prepared in Examples and Comparative Examples, wherein FIG. 3a shows a water uptake rate based on weight, and FIG. 3b shows a water uptake based on volume.

DETAILED DESCRIPTION OF THE INVENTION

Figure 1A:
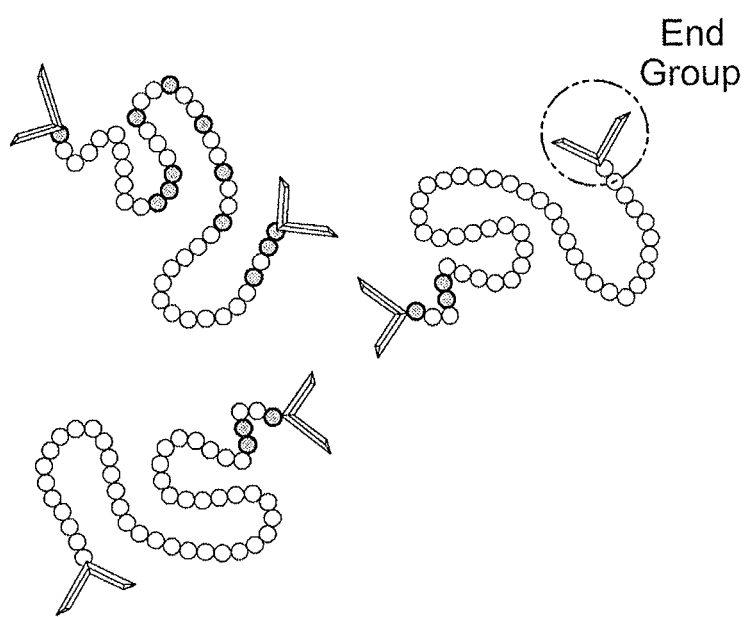
FIG. 1 is a schematic diagram showing that the polymer monomer of the present invention is cross-linked, wherein (a) represents a configuration before the cross-linking, and (b) represents a configuration after the cross-linking.

Hereinafter, the present invention will be described in detail.

The present invention provides sulfonated poly(phenylene sulfide sulfone nitrile) represented by one selected from the following Formulae 1 to 5:

[Formula 1]

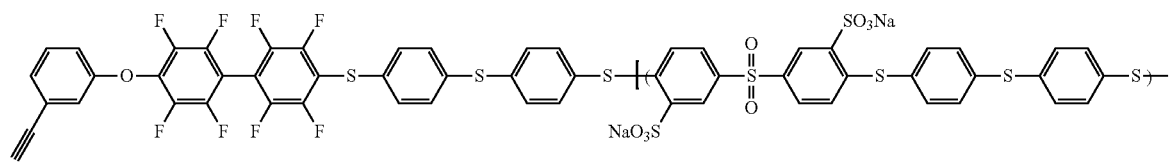

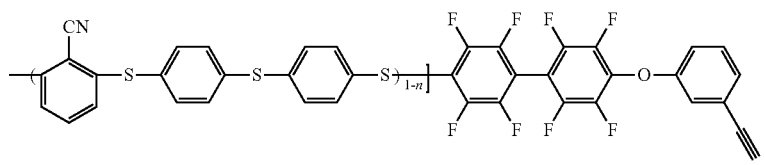

[Formula 2]

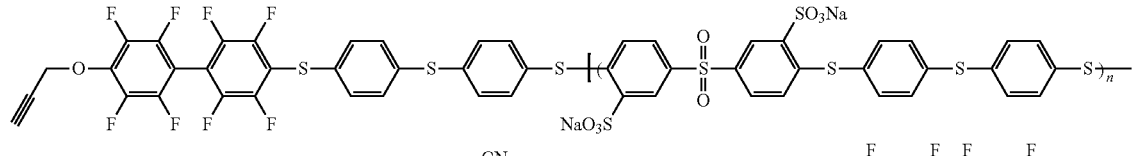

[Formula 3]

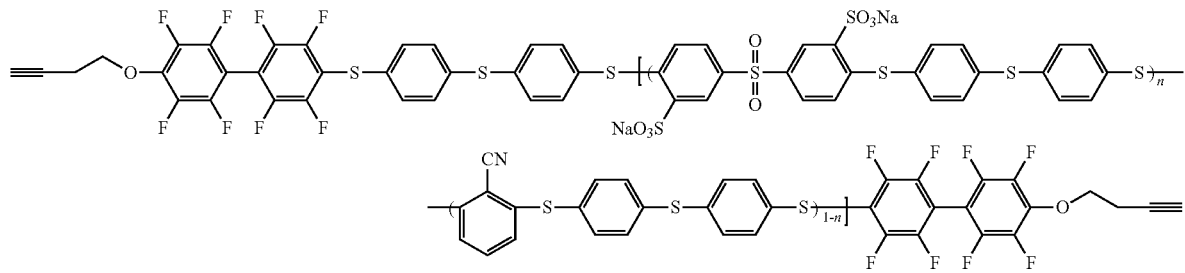

[Formula 4]

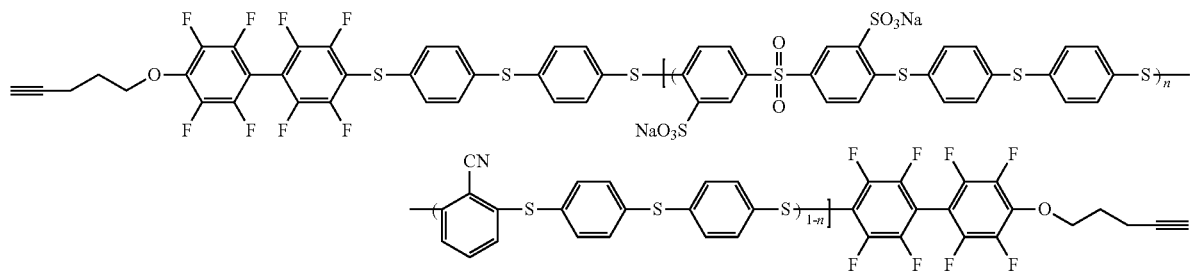

[Formula 5]

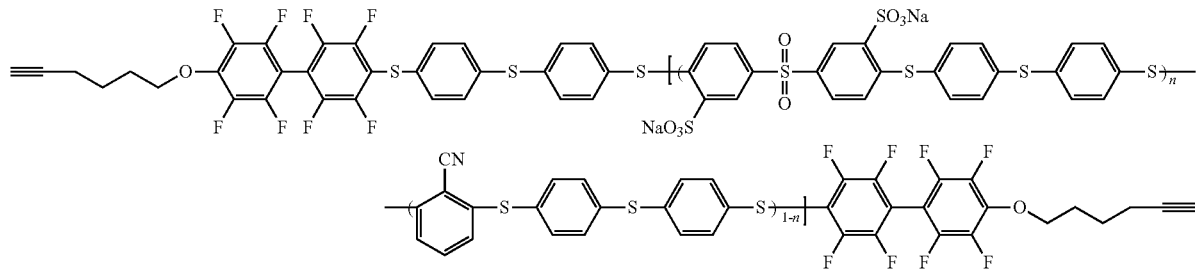

wherein n represents the number of a sulfone-containing monomer in the sulfonated poly(phenylene sulfide sulfone nitrile), which represents a degree of sulfonation. In certain embodiments, n ranges from 0.5 to 0.9.

As the polymer of Formula 1 according to the present invention has a triple bond at its ends, it is possible to form cross-links between both ends. Therefore, it is preferable to use the polymer for preparing a polymer electrolyte membrane through end cross-linking.

Compared with other similar sulfonated polymers, the polymers of Formulae 1 to 5 show high sulfonation degrees. The main chain in these polymers is composed of an aromatic ring, sulfide and sulfone, and an introduced nitrile group thereof.

The present invention provides sulfonated poly(phenylene sulfide sulfone nitrile) with a novel polymer structure, showing a good thermostability, a good chemical stability, a good oxidation stability, and a high bonding capability to a catalyst layer.

The sulfonated poly(phenylene sulfide sulfone nitrile) according to the present invention can be prepared by the following steps:

synthesizing an A-B random polymer having a thiol group by polymerizing a hydrophilic repeat unit (A) monomer composed of 4,4'-thiobisbenzenethiol and 3,3'-disulfonated-4,4'-dichlorodiphenyl sulfone and a hydrophobic repeat unit (B) monomer composed of 4,4'-thiobisbenzenethiol and 2,6-dichlorobenzonitril;

synthesizing a C-A-B-C polymer by linking decafluorobiphenyl (C) as a linker to each of (A) and (B) ends of the A-B polymer; and forming a random polymer having a D-C-A-B-C-D structure by using (D) having a triple bond as an end group for cross-linking at both ends (C) of the C-A-B-C polymer, wherein (D) is selected from the group consisting of ethynylphenol, propagyl alcohol, 3-butynol, 4-pentynol and 5-hexynol.

In the course of preparation, the random polymer can be prepared by polycondensation of the hydrophilic repeat unit (A) and hydrophobic repeat unit (B) at a temperature of 160° C.

Further, the linking between the A-B polymer and the monomer (C) can be carried out by adding the monomer (C) to the A-B polymer solution and reacting them at a temperature of 80 to 120° C. The last step of linking the monomer (C) to the monomer (D) can be conducted by adding the monomer (D) to the reaction solution of the C-A-B-C polymer and reacting the same at a temperature of 80 to 120° C.

Such a preparation method according to the present invention can be illustrated in the following Reaction Scheme 1.

[Reaction Scheme 1]

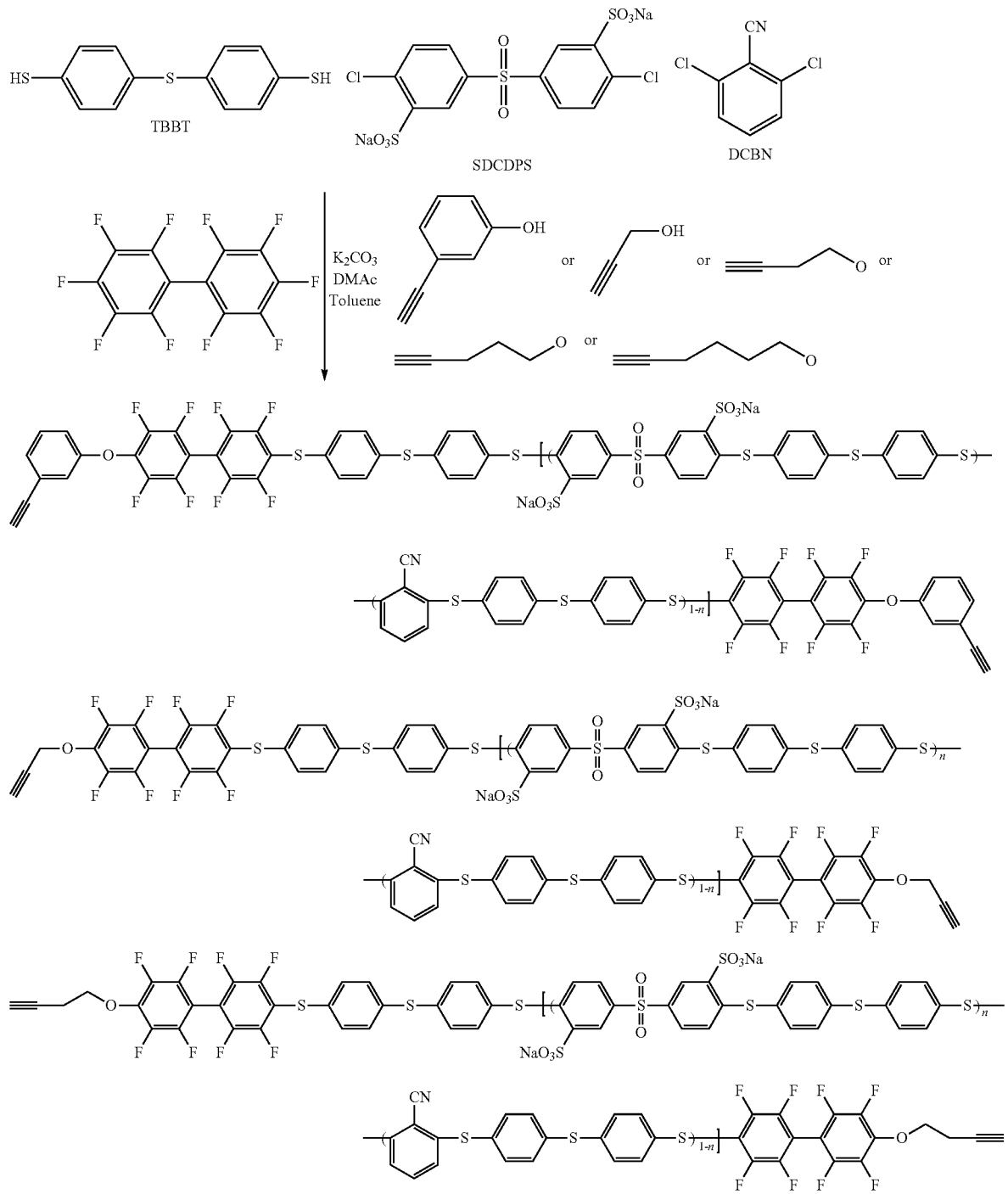

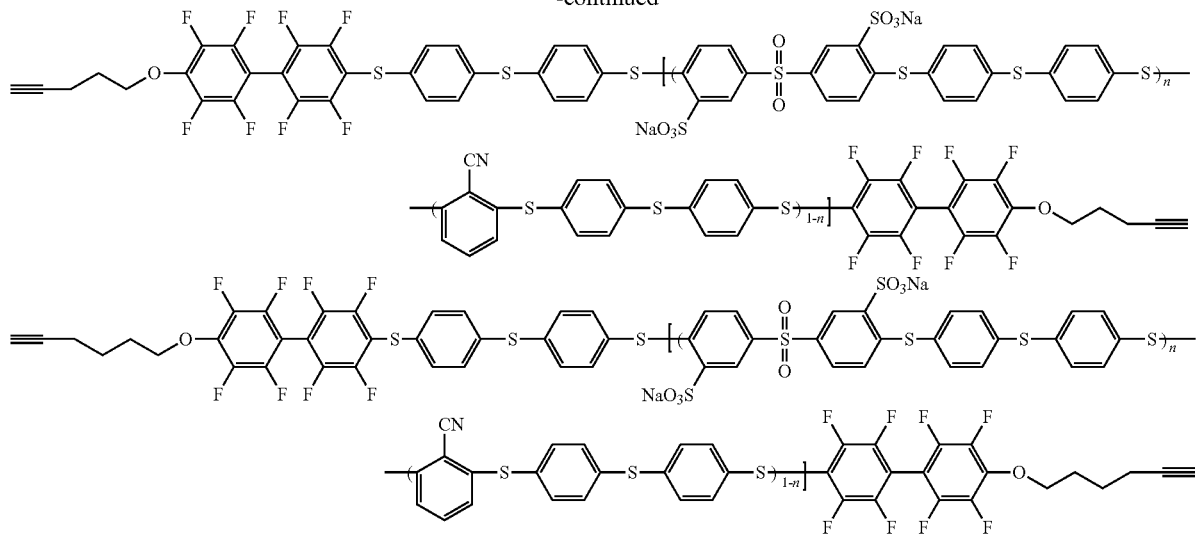

Meanwhile, the present invention provides a polymer electrolyte membrane in which the sulfonated poly(phenylene sulfide sulfone nitriles) represented by Formulae 1 to 5 are cross-linked each other at their ends.

Such a polymer electrolyte membrane, for example, can be prepared by heating the sulfonated poly(phenylene sulfide sulfone nitriles) of Formulae 1 to 5 to a temperature of 220 to 280° C. and forming cross-links between their ends. If the heating temperature is too high, the main chain of the polymer will degrade. If the heating temperature is too low, the cross-links will not be successfully formed.

The following Reaction Scheme 2 is offered to illustrate the mechanism of the cross-linking reaction by heating. As shown, three ethynyl groups get into contact with each other to form a benzene ring, leading to the formation of cross-links.

[Reaction Scheme 2]

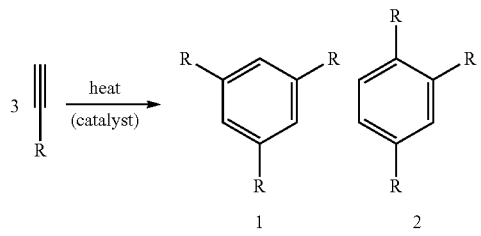

The polymer electrolyte membrane obtained by cross-linking of the polymer of Formulae 1 to 5 according to the present invention shows a sulfonation degree of 30% or higher. The polymer of the invention can form efficiently cross-links without causing any change or decrease in a sulfonic acid group of sulfonated poly(phenylene sulfide sulfone nitrile) or a polymer chain structure thereof during the end cross-linking process.

Figure 1B:
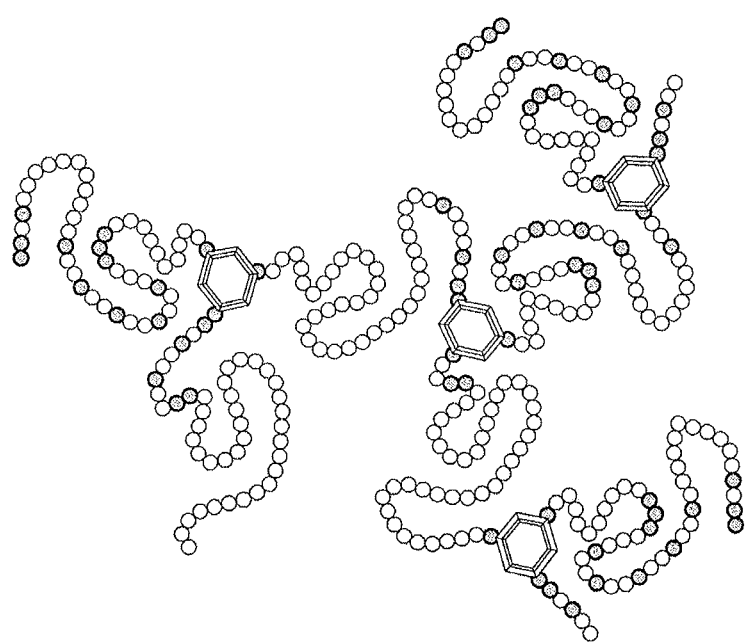

FIG. 1 is a schematic diagram showing that the polymer represented by Formulae 1 to 5 according to the present invention is cross-linked. FIG. 1(a) represents a configuration before the cross-linking, and FIG. 1(b) represents a configuration after the cross-linking.

Therefore, according to the method of the present invention, it is possible to prepare a polymer membrane having a sulfonation degree of 30% or higher, which has an improved conductivity, an improved dimensional stability and improved mechanical properties, thereby making it possible to obtain a polymer electrolyte membrane with a superior fuel cell performance under low moisture conditions. Further, since the polymer of the present invention includes a main chain composed of an aromatic ring, sulfide and sulfone, a high stability can be maintained both before and after the cross-linking. The introduction of a nitrile group into the main chain of the polymer significantly increases its bonding capability to a catalyst layer during the preparation of a membrane-electrode assembly (MEA) useful in a polymer electrolyte membrane fuel cell.

Meanwhile, the present invention provides a polymer electrolyte membrane prepared from the sulfonated poly(phenylene sulfide sulfone nitriles) of Formulae 1 to 5, a membrane-electrode assembly for fuel cells comprising the same, and a fuel cell system comprising the assembly.

The polymer electrolyte membrane of the present invention can be used to prepare a polymer electrolyte membrane for fuel cells which has a thickness of 10 to 150 μm.

Further, when the polymer electrolyte membrane of the present invention is used in a fuel cell, it can be included in a membrane-electrode assembly for fuel cells, which comprises an anode and a cathode that are oppositely arranged; and the polymer electrolyte membrane according to the present invention which is located between the anode and cathode.

In addition, the present invention provides a fuel cell system, comprising one or more of the membrane-electrode assembly according to the present invention and a separator; an electric generator that generates electricity through an electrochemical reaction between a fuel and an oxidant; a fuel supplier that supplies a fuel to the electric generator; and an oxidant supplier that supplies an oxidant to the electric generator.

The present invention is further illustrated by the following examples. However, it shall be understood that these examples are only used to illustrate the present invention, rather than being understood that they are used to limit the present invention in any form. Here, end groups in sulfonated poly(phenylene sulfide sulfone nitriles) (ESPSSN)(Comparative Examples 1-3) and end groups cross-linked in sulfonated poly(phenylene sulfide sulfone nitriles) (XESPSSN) (Examples 1-3) were compared.

PREPARATION EXAMPLE

Synthesis of Formula 1

In a 4-neck flask, 4,4'-thiobisbenzenethiol, 3,3'-disulfonated-4,4'-dichlorodiphenyl sulfone and 2,6-dichlorobenzonitrile were dissolved in DMAc by using potassium carbonate as a catalyst. After installing a Dean-Stark trap and a condenser on the 4-neck flask, the reaction was carried out at a temperature of 140 to 150° C., and water generated thereby was removed by using toluene. After water and toluene were completely removed, a polymerization reaction was continued at 160° C. or higher. To the reaction solution was added a decafluorobiphenyl solution dissolved in DMAc, followed by a reaction at 120° C. or lower, thereby to synthesize decafluorobiphenyl at the ends of the polymer. An ethynylphenol solution was added to the resulting solution to synthesize a polymer having a triple bond at its ends, followed by a reaction at 120° C. or lower. Thus synthesized polymer solution was precipitated in a mixed solution of water and isopropanol, the polymer precipitated above was sufficiently dried under vacuum at 120° C., thereby to obtain ESPSSN as a compound of Formula 1 that is capable of forming cross-links.

Figure 6:
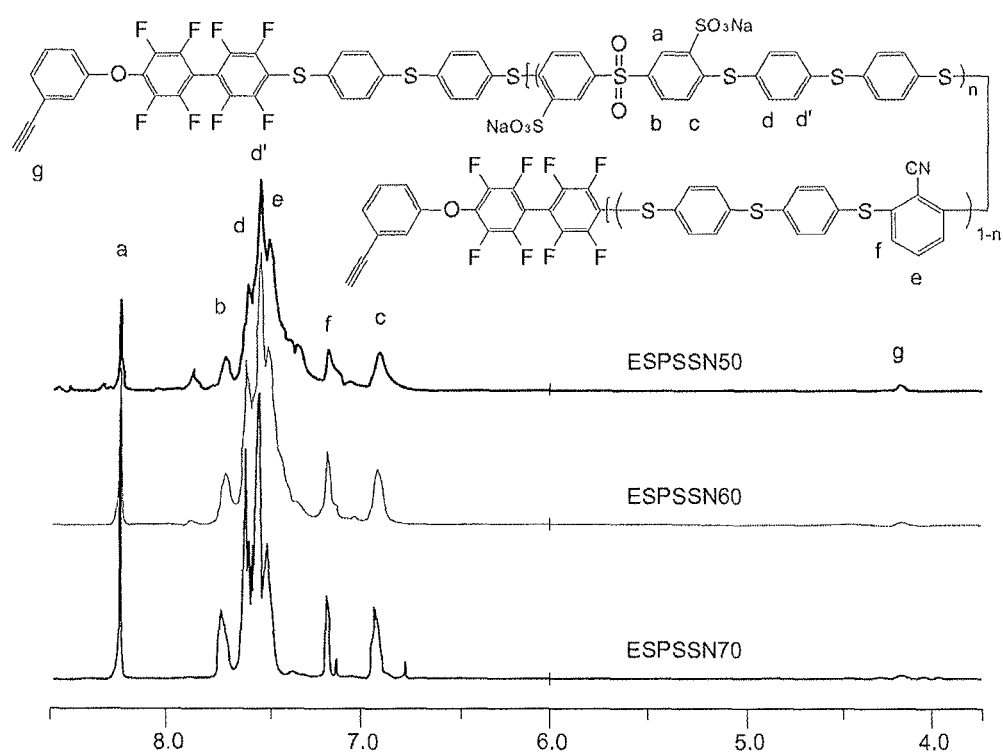
FIG. 6 is an H-NMR spectrum of the compound represented by Formula 1 prepared in Preparation Example.

As a result of analyzing H-NMR and a molecular weight of the thus obtained compound, it was confirmed that an ethynyl group binds to the ends of the compound that has a number average molecular weight (Mn) of 17577 to 29550 and a weight average molecular weight (Mw) of 75502 to 88000 (see FIG. 6).

Examples 1-3

Preparation of a Polymer Electrolyte Membrane Through Cross-Linking

The dried sulfonated copolymer was dissolved in DMAc to prepare a solution at a concentration of 10 to 15 wt %. The resulting solution was subjected to casting on a glass plate, followed by drying at 120° C. Thus obtained polymer membranes having a sulfonation degree of 50, 60 and 70, respectively, were heated at a temperature of 220 to 280° C. to induce cross-linking between their ends, thereby to obtain membranes of Example 1 (50 of sulfonation degree), Example 2 (60 of sulfonation degree), and Example 3 (70 of sulfonation degree). Each membrane of Examples 1 to 3 was soaked in a 1.0 M $H_2SO_4$ solution for 2 hours and washed with distilled water for 2 hours, thereby to obtain $H^+$ type electrolyte membranes of Examples 1 to 3.

COMPARATIVE EXAMPLES 1-4

Preparation of a Polymer Electrolyte Membrane without Cross-Linking

The dried sulfonated copolymer was dissolved in DMAc to prepare a solution at a concentration of 10 to 15 wt %. The resulting solution was filtered, subjected to casting on a glass plate and dried. Each membrane of Comparative Example 1 (50 of sulfonation degree), Comparative Example 2 (60 of sulfonation degree), and Comparative Example 3 (70 of sulfonation degree) were soaked in a 1.0 M $H_2SO_4$ solution for 2 hours and washed with distilled water for 2 hours, thereby to obtain $H^+$ type electrolyte membranes of Comparative Examples 1 to 3.

An $H^+$ type electrolyte membrane of Comparative Example 4 (NR212) was prepared by purchasing a membrane available from DuPont Inc., soaking it in a 1.0 M $H_2SO_4$ solution for 2 hours and washing it with distilled water for 2 hours.

TEST EXAMPLES

Comparison Test for Performance of Polymer Electrolyte Membranes

Mechanical Properties

Figure 2A:
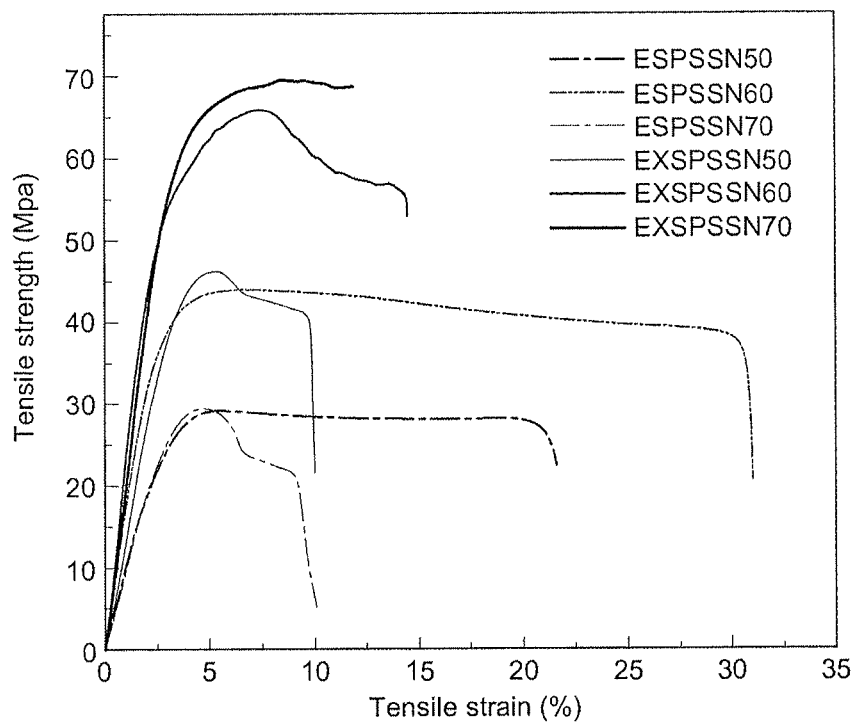
Figure 2B:
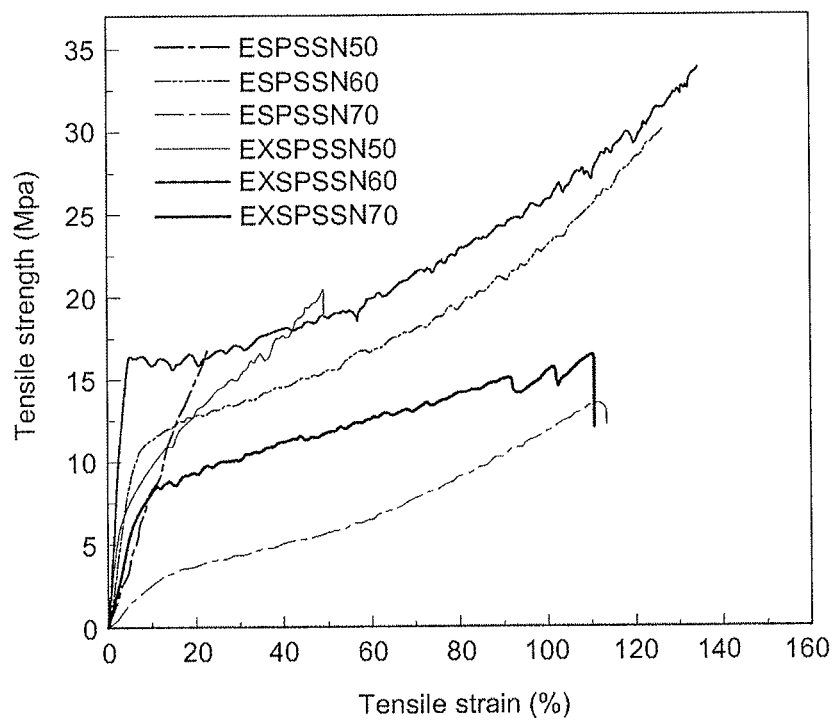

Tensile strength and tensile strain of the membranes were measured by using a universal testing machine (Shimazu, AGS-500NJ, Tokyo, Japan) according to a ISO37-4 standard method under dry and wet conditions, respectively. Mechanical properties of the membranes are shown in Table 1, FIG. 2a (Dry) and 2b (Wet).

TABLE 1

| | Dry | | Wet | |
|---|---|---|---|---|
| Sample | Tensile strength (Mpa) | Tensile strain (%) | Tensile strength (Mpa) | Tensile strain (%) |
| Comparative Example 1 | 33.86 (±8.7) | 21.9 (±2.3) | 17.12 (±3.2)r | 21.98 (±4.6) |
| Comparative Example 2 | 44.47 (±5.41) | 31.4 (±1.03) | 29.85 (±3.9) | 131.7 (±13.2) |
| Comparative Example 3 | 30.91 (±5.4) | 10.1 (±0.4) | 13.86 (±5.0) | 103.8 (±9.7) |
| Comparative Example 4 | 18.02 (±0.3) | 198.5 (±0.5) | 19.50 (±0.3) | 224.6 (±10.6) |
| Example 1 | 46.88 (±4.4) | 10.0 (±0.2) | 20.23 (±0.42) | 50.06 (±16.9) |
| Example 2 | 59.89 (±4.21) | 15.2 (±2.12) | 32.47 (±12) | 153.9 (±15.3) |
| Example 3 | 69.02 (±3.06) | 13.7 (±0.39) | 15.65 (±1.1) | 102.8 (±7.4) |

The membranes of Comparative Examples 1 to 4 showed a tensile strength of 18.02 to 44.47 Mpa and a tensile strain of 10.1-198.5% at 20° C. and 25% RH (relative humidity), and the membranes of Examples 1 to 3 showed a tensile strength of 46.88 to 69.02 Mpa and a tensile strain of 10.0 to 15.2% under the same conditions. As expected, it was confirmed that the tensile strain was slightly decreased after cross-linking, but the tensile strength was increased. Further, under the conditions of 20° C. and 100% RH, the membranes of Comparative Examples 1 to 4 showed a tensile strength of 13.86 to 29.85 Mpa and a tensile strain of 21.98 to 224.6%, and the membranes of Examples 1 to 3 showed a tensile strength of 15.65 to 32.47 Mpa and a tensile strain of 50.06 to 153.9%. These results suggest that the membrane of the present invention is durable and extensible enough to be used as a PEM material of fuel cells.

Test of IEC, Water Uptake Rate and Dimensional Stability

IEC (ion exchange capacity) refers to a value representing the amount of protons capable of exchanging in a membrane and can be measured according to an acid-base titration method.

After a proton substituted membrane sample was prepared in a size of 4 cm×4 cm, this sample was soaked in 100 ml of a 1.0 M NaCl solution and kept for 24 hours at room temperature to sufficiently induce ion exchange. The membrane sample was then removed from the NaCl solution, and a small amount of phenolphthaleine as a basic indicator was added thereto. The resulting solution was titrated with a 0.01 M NaOH solution until changing from an acid to a base. IECw was calculated by using the amount of NaOH used in the titration and a dry weight of the membrane. As a result of titration, the membrane sample had a IEC value of 2.05 to 2.58 mequiv/g, which is very close to the theoretical value of IEC ($IEC_{cal}$).

IECw based on weight has been generally used as IEC of the membrane, but the use of IECv (mequiv/cm$^3$) based on volume is more beneficial compared to ICE of different membranes depending on a water uptake rate. IECv in a membrane is defined as a mole concentration of a sulfonic acid group per unit volume including a water uptake rate, and can be calculated by the following Equatione 1 and 2.

$$IECv(\text{dry}) = IECw \times \text{density} \quad \text{[Equation 1]}$$

$$IEC_v(\text{wet}) = \frac{IEC_v}{1 + 0.01 WU_w(vol\ \%)} \times 100 \quad \text{[Equation 2]}$$

A membrane density was measured by using isooctane as a solvent after drying at 120° C. for 24 hours.

The water uptake (WU) rate was assessed based on weight (WUw) or on volume (WUv). To measure the water uptake rate, the polymer electrolyte membrane for fuel cells was cut into a sample in a size of 4 cm×4 cm. The dry weight ($W_{dry}$) of the polymer electrolyte membrane for fuel cells was then measured, followed by soaking it in a distilled water at 80° C. for 24 hours. The polymer electrolyte membrane for fuel cells was removed therefrom and its wet weight ($W_{wet}$) was measured. The water uptake rate was calculated by the following Equatione 3 and 4.

$$WU_w(\text{wt}\ \%) = \frac{W_{wet} - W_{dry}}{W_{dry}} \times 100 \quad \text{[Equation 3]}$$

$$WU_v(vol\ \%) = \frac{(W_{wet} - W_{dry})/\delta_W}{(W_{dry}/\delta_M)} \times 100 \quad \text{[Equation 4]}$$

In Equatione 3 and 4, $W_{dry}$ represents the weight of the polymer electrolyte membrane for fuel cells under dry condition, and $W_{wet}$ represents the weight thereof under wet condition.

Figure 3A:
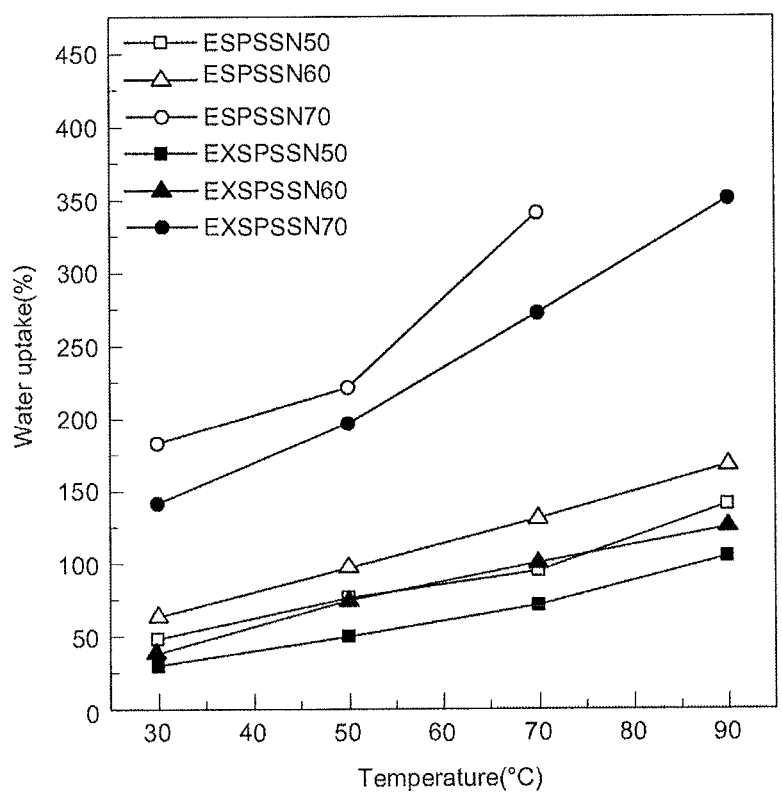
Figure 3B:
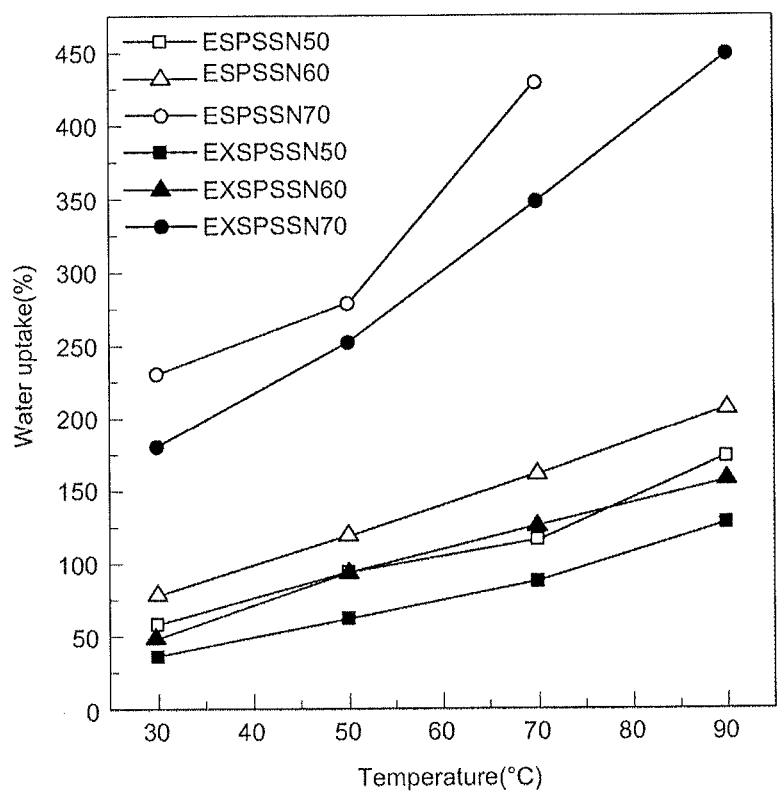

Table 2 provides the results of comparing the density, IEC and water uptake rate (based on weight and volume) of the copolymer membranes before and after cross-linking, and the results are also shown in FIG. 3a (weight) and FIG. 3b (volume).

TABLE 2

| Sample | Density g/cm$^3$ | $IEC_{cal}$ meq./g | IECw meq./g | IECv (dry) meq./cm$^3$ | IECv (wet) meq./cm$^3$ | Water uptake wt % | Water uptake vol % |
|---|---|---|---|---|---|---|---|
| Comparative Example 1 | 1.23 | 2.05 | 1.96 | 2.41 | 1.51 | 47.7 | 58.6 |
| Comparative Example 2 | 1.25 | 2.33 | 2.2 | 2.75 | 1.53 | 64.1 | 78.8 |
| Comparative Example 3 | 1.26 | 2.58 | 2.49 | 3.13 | 0.94 | 182.6 | 230 |
| Comparative Example 4 | 1.97 | 0.98 | 0.98 | 1.93 | 1.28 | 21.6 | 42.5 |
| Example 1 | 1.23 | 2.05 | 2.02 | 2.48 | 1.81 | 29.8 | 36.6 |
| Example 2 | 1.26 | 2.33 | 2.28 | 2.87 | 1.92 | 38.9 | 49 |
| Example 3 | 1.28 | 2.58 | 2.53 | 3.23 | 1.15 | 140.5 | 179.8 |

The water uptake, IECw (wet) and IECv (dry) were increased in proportion to an increase in hydrophilicity. The membranes of Comparative Examples showed IECw of 0.98 to 2.49 meq./g, and those of Examples showed IECw of 2.02 to 2.53 meq./g, which suggests that they have the similar total amount of ion exchange. However, in the case of IECv based on volume, the membranes of Comparative Examples showed IECv (dry) of 1.93 to 3.13 meq./cm$^3$, while those of Examples showed IECv (dry) of 2.48 to 3.23 meq./cm$^3$. From these results, it was confirmed that although they had the same sulfonation degree, the membranes of Examples according to the present invention showed increase in the total amount of ion exchange.

The water uptake rate is generally based on weight (WUw). The membranes of Comparative Examples showed a water uptake rate of 47.7 to 182.6% at 30° C. under hydrated conditions, and those of Examples showed a lower water uptake rate of 29.8 to 140.5% under the same conditions. Regarding water uptake based on volume (WUv), those of Comparative Examples showed a water uptake rate of 58.6 to 230% at 30° C. under hydrated conditions, and the membranes of Examples showed a lower water uptake of 36.6 to 79.8% under the same conditions. From these results, it has been found that the membranes of the present invention can reduce water uptake, thereby improving performance stability of fuel cells.

Proton Conductivity

A polymer electrolyte membrane for fuel cells was cut into a size of 1 cm×4 cm and fixed to an impedance/gainphase analyzer (Solartron 1260) and an electrochemical interface (Solartron 1287, Farnborough, Hampshire, UK). The R value of the membrane was measured by using these equipments, and proton conductivity thereof was calculated according to the following Equation 5.

$$\text{Proton conductivity} = d/(Ls \times Ws \times R) \quad \text{[Equation 5]}$$

wherein d is a distance between electrodes,

Ls is a thickness of a polymer electrolyte membrane for fuel cells,

Ws is a width of a polymer electrolyte membrane for fuel cell (1 cm), and

R is a resistance.

Figure 4:
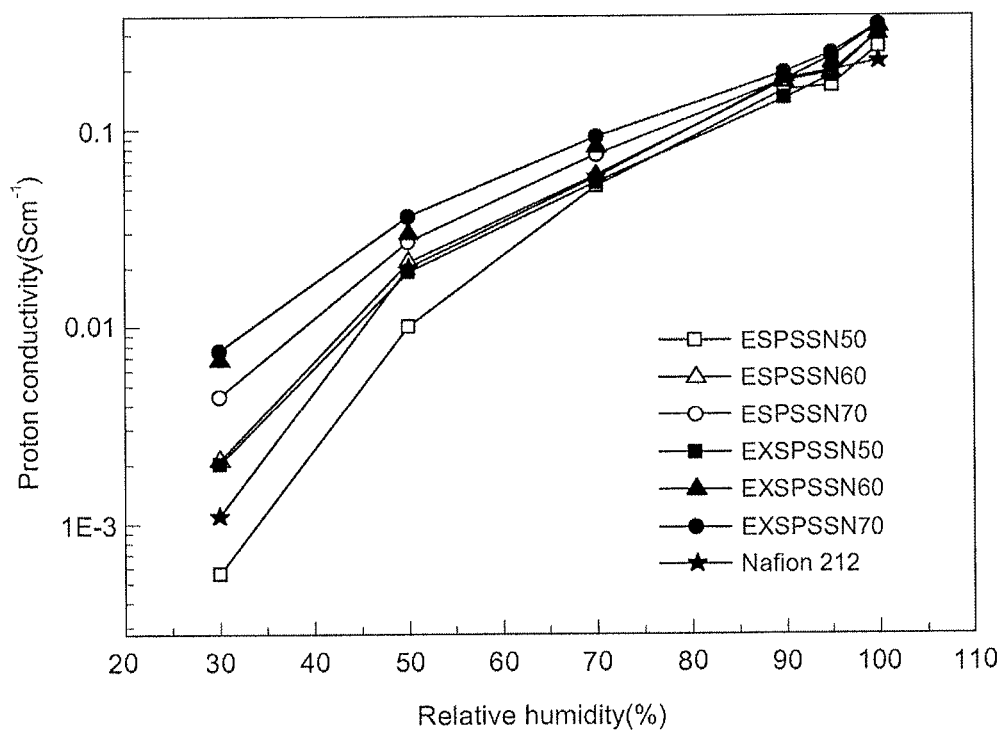
FIG. 4 is a graph comparing proton conductivities of the polymer membranes prepared in Examples and Comparative Examples.

The proton conductivity of sulfonated poly(phenylene sulfide sulfone nitrile) membranes was measured at 80° C. and 30-100% RH, and the results are shown in the following Table 3 and FIG. 4.

TABLE 3

| Relative humidity (%) | Comparative Example 1 | Comparative Example 2 | Comparative Example 3 | Comparative Example 4 | Example 1 | Example 2 | Example 3 |
|---|---|---|---|---|---|---|---|
| 30 | 5.60E−04 | 0.002 | 0.0021 | 0.0011 | 0.0068 | 0.0044 | 0.0075 |
| 50 | 0.01 | 0.019 | 0.021 | 0.0199 | 0.03 | 0.027 | 0.036 |
| 70 | 0.051 | 0.054 | 0.058 | 0.0575 | 0.081 | 0.074 | 0.091 |
| 90 | 0.157 | 0.143 | 0.173 | 0.1775 | 0.183 | 0.181 | 0.192 |
| 95 | 0.166 | 0.184 | 0.192 | 0.1968 | 0.216 | 0.228 | 0.241 |
| 100 | 0.259 | 0.307 | 0.301 | 0.22 | 0.329 | 0.324 | 0.333 |

Comparing the membranes of Comparative Examples with those of Examples having similar IEC values, the membranes of Examples according to the present invention showed higher proton conductivity under all tested RH conditions than those of Comparative Examples. These results suggest that the membranes prepared according to the present invention have significantly improved proton conductivity.

Mostly, the proton conductivity of the polymer electrolyte membranes is dependent on RH. As can be seen in Table 3, all the membranes showed a tendency to increase proton conductivity in proportion to the increase in RH. At 100% RH, all the membranes of Examples showed higher proton conductivity than that of Comparative Example 4. In particular, all the membranes of Examples showed improved proton conductivity by 150% or higher even under low humidity conditions (<50% RH), as compared with that of Comparative Example 4.

Measurement of Unit Cell Performance

Figure 5:
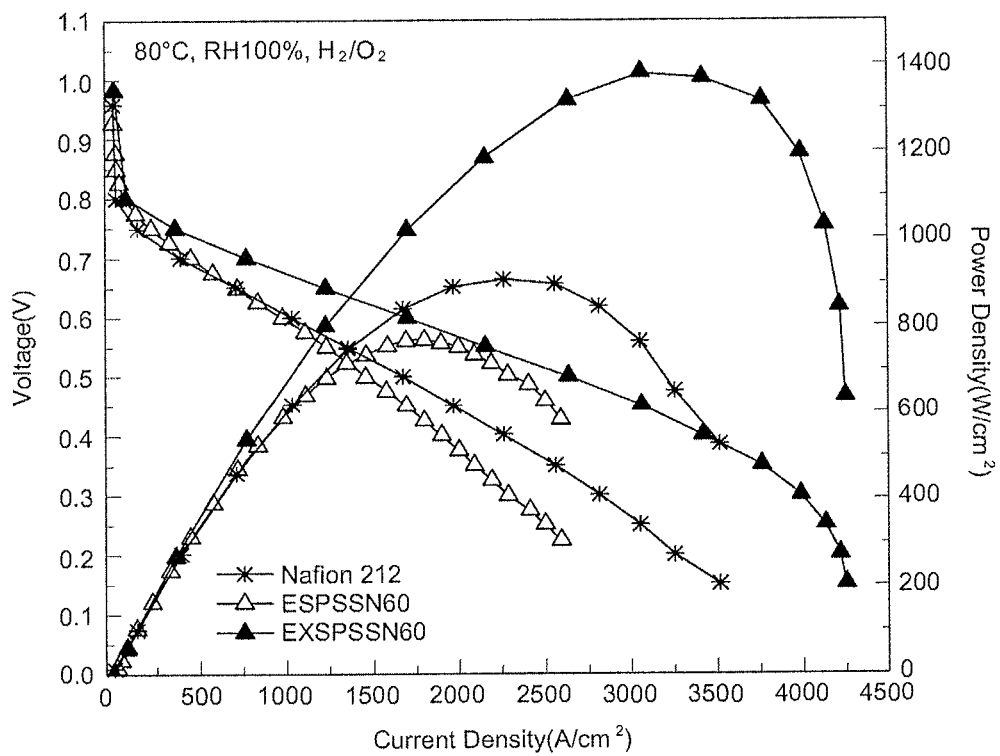
FIG. 5 is a graph comparing unit cell performance of the polymer membranes prepared in Examples and Comparative Examples.

Unit cell performance of the membranes according to Examples of the present invention was compared with those of Comparative Examples and the results are shown in the following Table 4 and FIG. 5. To measure unit cell performance, a membrane electrode assembly (MEA) was manufactured according to a CCS method using screen printing. At this time, the content of platinum (Pt) loaded on the MEA was 0.3 mg/cm². As a fuel electrode/air electrode, a $H_2/O_2$ system was employed, and operating conditions were at 80° C. and 100% RH. As shown in the following Table 4, it was found that unit cell performance of Example 2 showed significantly higher current density and voltage density than those of Comparative Examples 2 and 4.

TABLE 4

| | Current density at 0.6 V | Maximum voltage density |
|---|---|---|
| Comparative Example 4 | 1032 | 0.90 |
| Comparative Example 2 | 980 | 0.76 |
| Example 2 | 1462 | 1.19 |

Advantages and features of the present invention and methods for achieving the same will be appreciated to those skilled in the art to which the present invention relates from reading the above Examples. However, it shall be understood that the present invention is not intended to be limited by these Examples and will be realized in various different types. Further, these Examples are only used to illustrate the present invention. By no means, the Examples should be construed to define the scope of the present invention.

What is claimed is:

1. A polymer electrolyte membrane comprising sulfonated poly(phenylene sulfide sulfone nitriles) with their ends cross-linked to each other, wherein the sulfonated poly(phenylene sulfide sulfone nitrile) represented by one of the following Formulae 1 to 5:

[Formula 1]

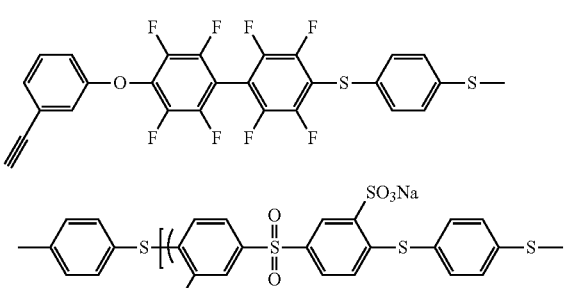

[Formula 2]

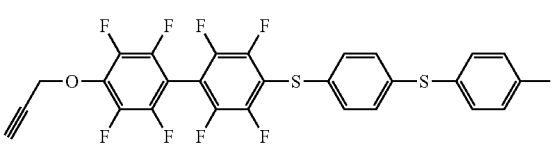

[Formula 3]

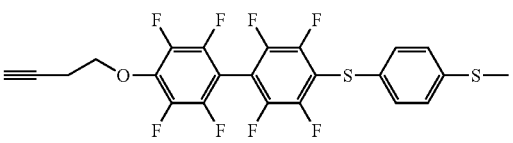

-continued

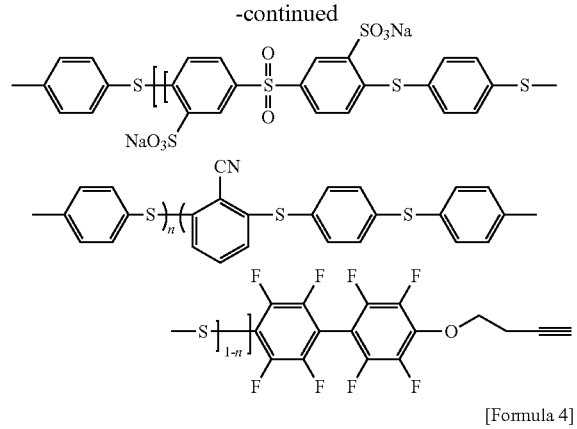

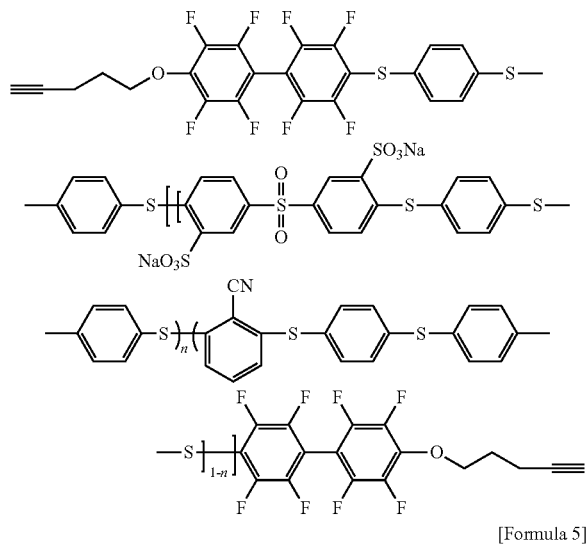

[Formula 4]

[Formula 5]

-continued

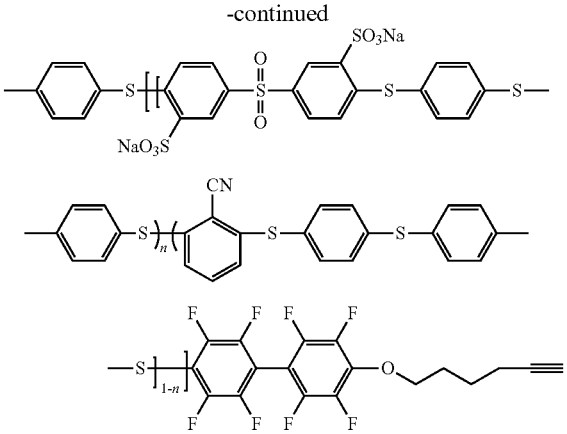

wherein n represents the number of a sulfone-containing monomer in the sulfonated poly(phenylene sulfide sulfone nitrile).

2. A method of preparing sulfonated poly(phenylene sulfide sulfone nitrile) represented by one of the following Formulae 1 to 5, comprising:

synthesizing an A-B random polymer having a thiol group by polymerizing a hydrophilic repeat unit (A) composed of 4,4'-thiobisbenzenethiol and 3,3'-disulfonated-4,4'-dichlorodiphenyl sulfone and a hydrophobic repeat unit (B) composed of 4,4'-thiobisbenzenethiol and 2,6-dichlorobenzonitril;

synthesizing a C-A-B-C polymer by linking decafluorobiphenyl (C) to each of the (A) and (B) ends of the A-B polymer; and forming a random polymer having a D-C-A-B-C-D structure by cross-linking (D) having a triple bond as an end group for with both ends (C) of the C-A-B-C polymer, wherein (D) is selected from the group consisting of ethynylphenol, propagyl alcohol, 3-butynol, 4-pentynol and 5-hexynol:

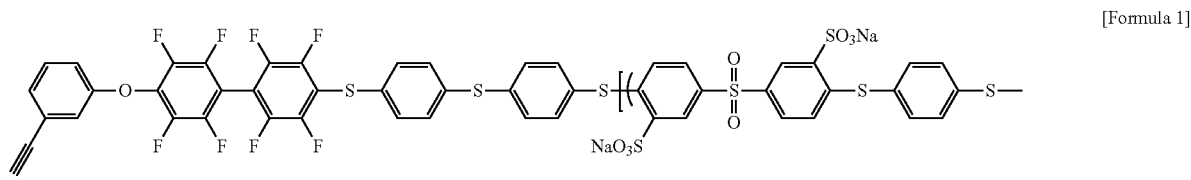

[Formula 1]

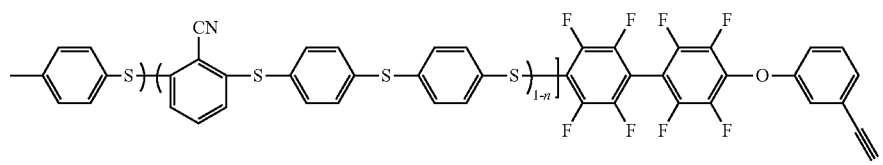

[Formula 2]

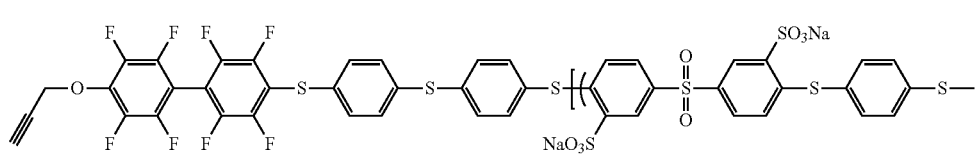

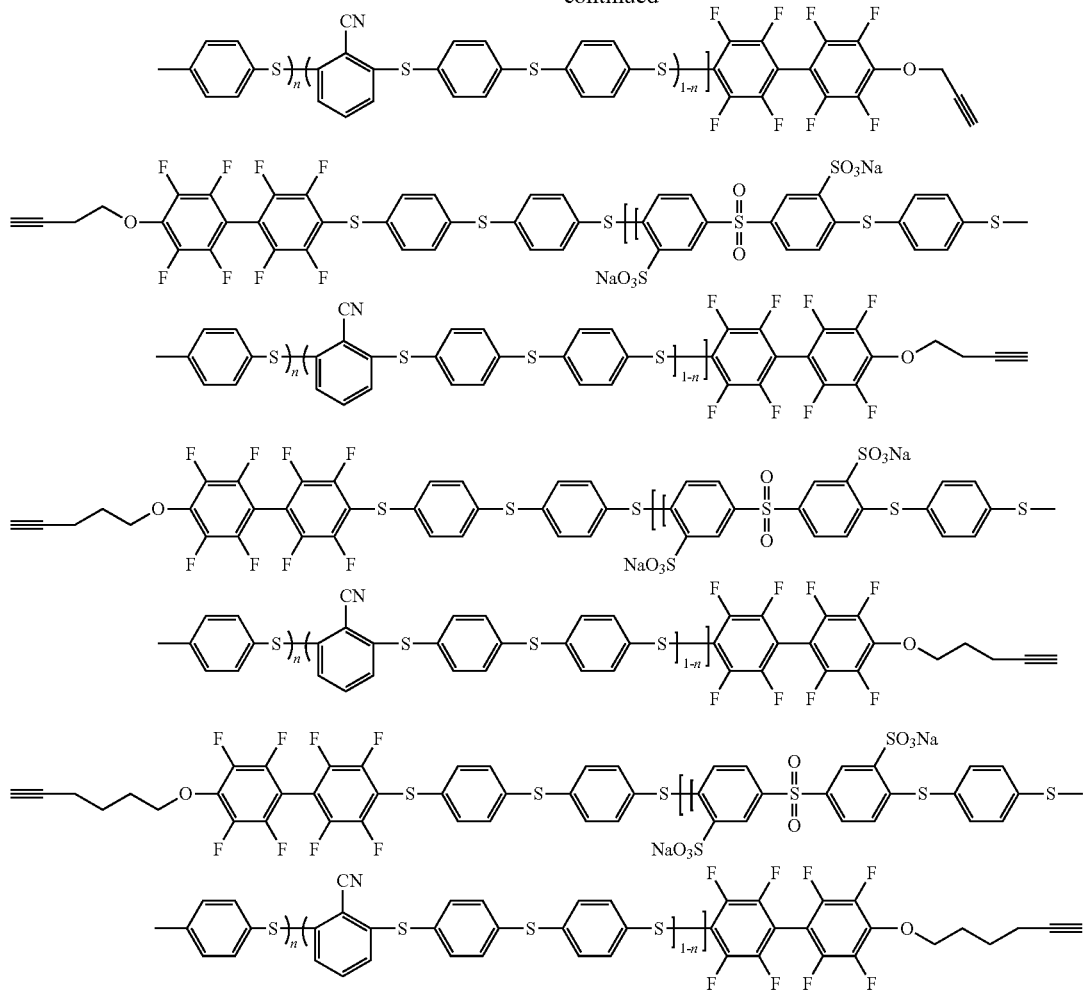

[Formula 3]

[Formula 4]

[Formula 5]

wherein n represents the number of a sulfone-containing monomer in the sulfonated poly(phenylene sulfide sulfone nitrile).

3. The method according to claim 2, wherein the random polymer is prepared by polycondensation of the hydrophilic repeat unit (A) and hydrophobic repeat unit (B) at a temperature of 160° C. or higher; the coupling between the A-B polymer and (C) is carried out at a temperature of 80 to 120° C. or lower; and the formation of the D-C-A-B-C-D polymer is conducted by adding (D) to a solution of the C-A-B-C polymer followed by a reaction at a temperature of 80 to 120° C. or lower.

4. A polymer electrolyte membrane comprising the sulfonated poly(phenylene sulfide sulfone nitriles) according to claim 1 with their ends cross-linked to each other.

5. A polymer electrolyte membrane comprising the polymer electrolyte membrane according to claim 4, wherein said polymer electrolyte membrane has a thickness of 10 to 150 μm.

6. A membrane-electrode assembly for fuel cells, comprising
an anode and a cathode that are oppositely arranged; and
the polymer electrolyte membrane according to claim 5, wherein said polymer electrolyte membrane is located between the anode and cathode.

7. A fuel cell system, comprising
one or more of the membrane-electrode assembly according to claim 6 and a separator,
an electric generator that generates electricity through an electrochemical reaction between a fuel and an oxidant;
a fuel supplier that supplies a fuel to the electric generator; and
an oxidant supplier that supplies an oxidant to the electric generator.

8. A method of preparing a polymer electrolyte membrane, comprising
heating the sulfonated poly(phenylene sulfide sulfone nitriles) according to claim 1 to a temperature of 220 to 280° C. and forming cross-links between their ends, thereby preparing a polymer electrolyte membrane.

* * * * *